March 24, 1931.     J. H. WILSON     1,797,462
TANK FOR COMBINED HARVESTERS AND THRASHERS
Filed Jan. 14, 1930     5 Sheets-Sheet 1
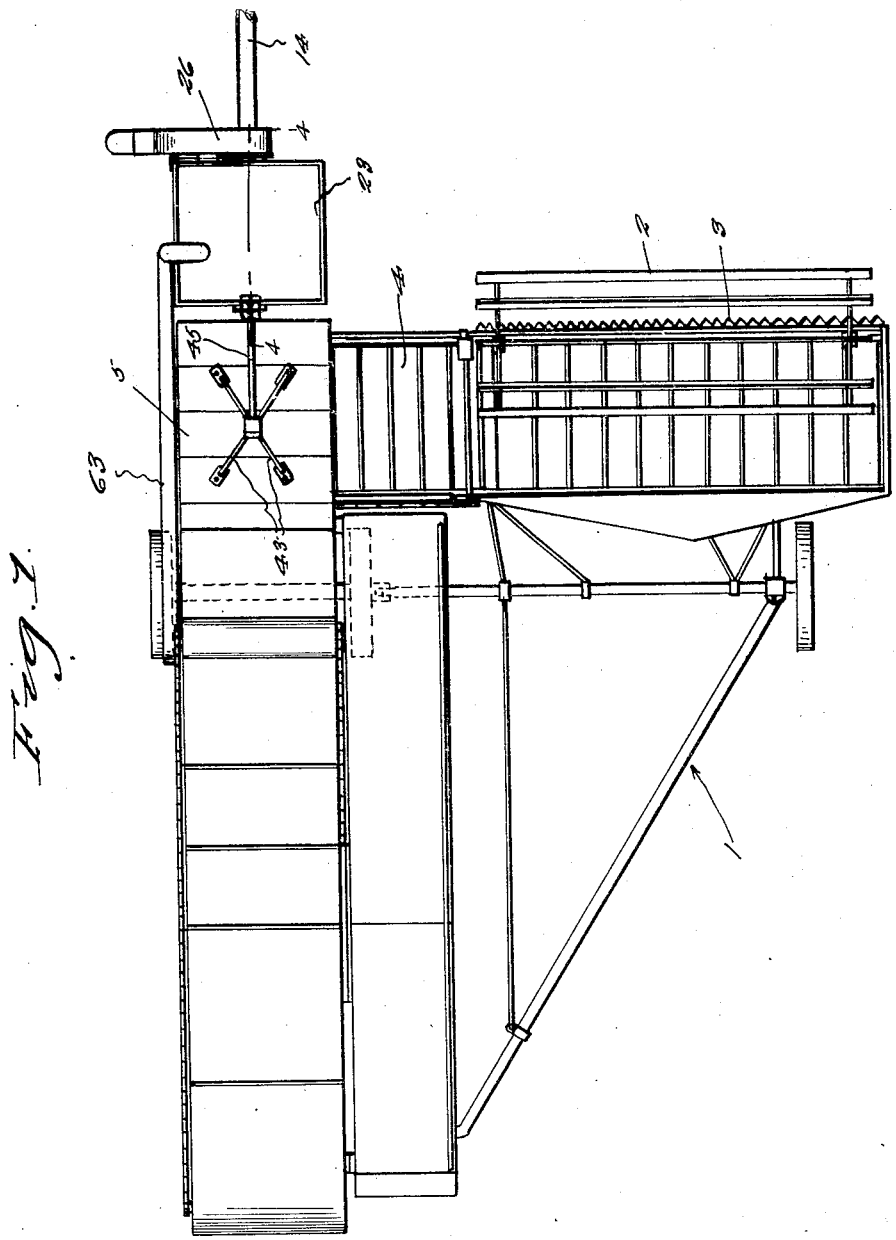
Inventor
J. H. Wilson
By Clarence A. O'Brien
Attorney

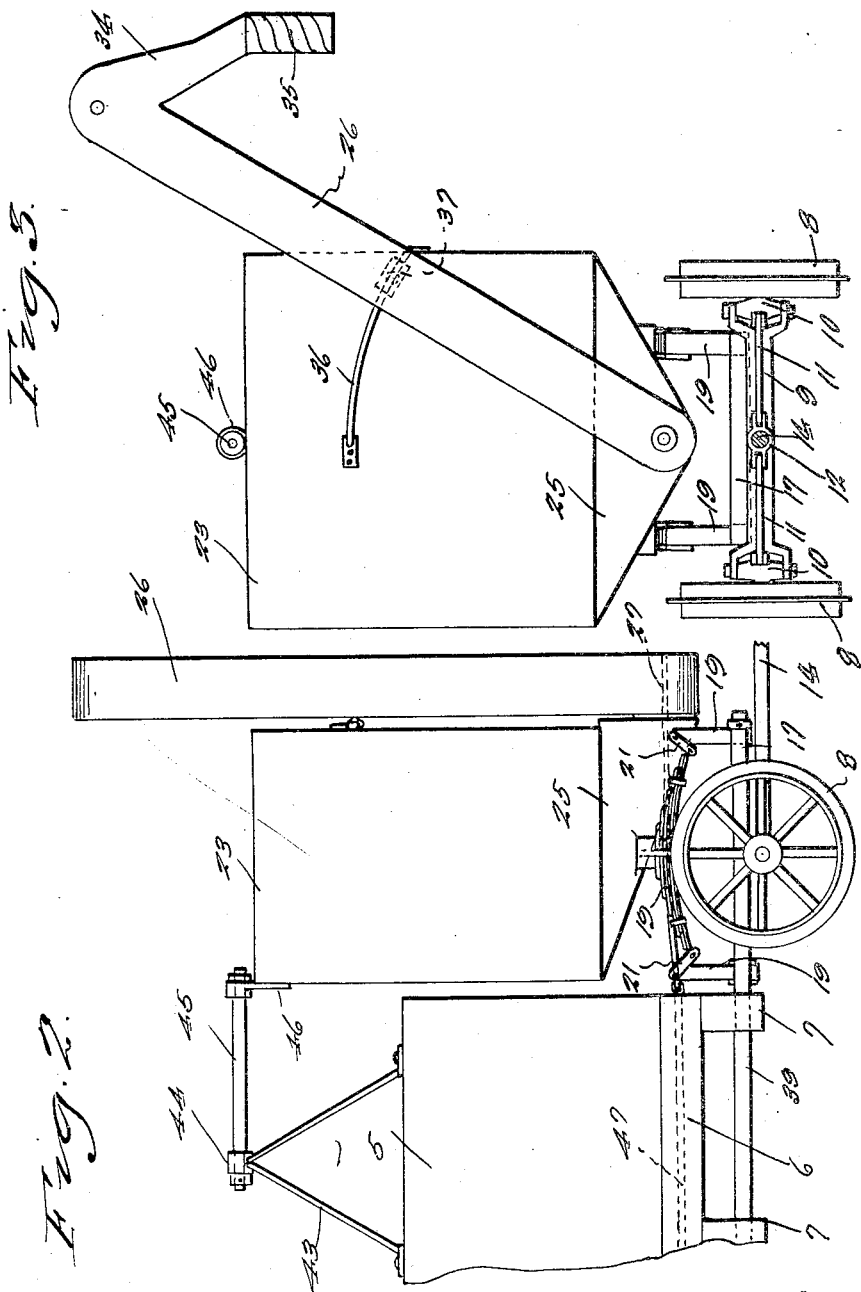

March 24, 1931. J. H. WILSON 1,797,462
TANK FOR COMBINED HARVESTERS AND THRASHERS
Filed Jan. 14, 1930 5 Sheets-Sheet 3
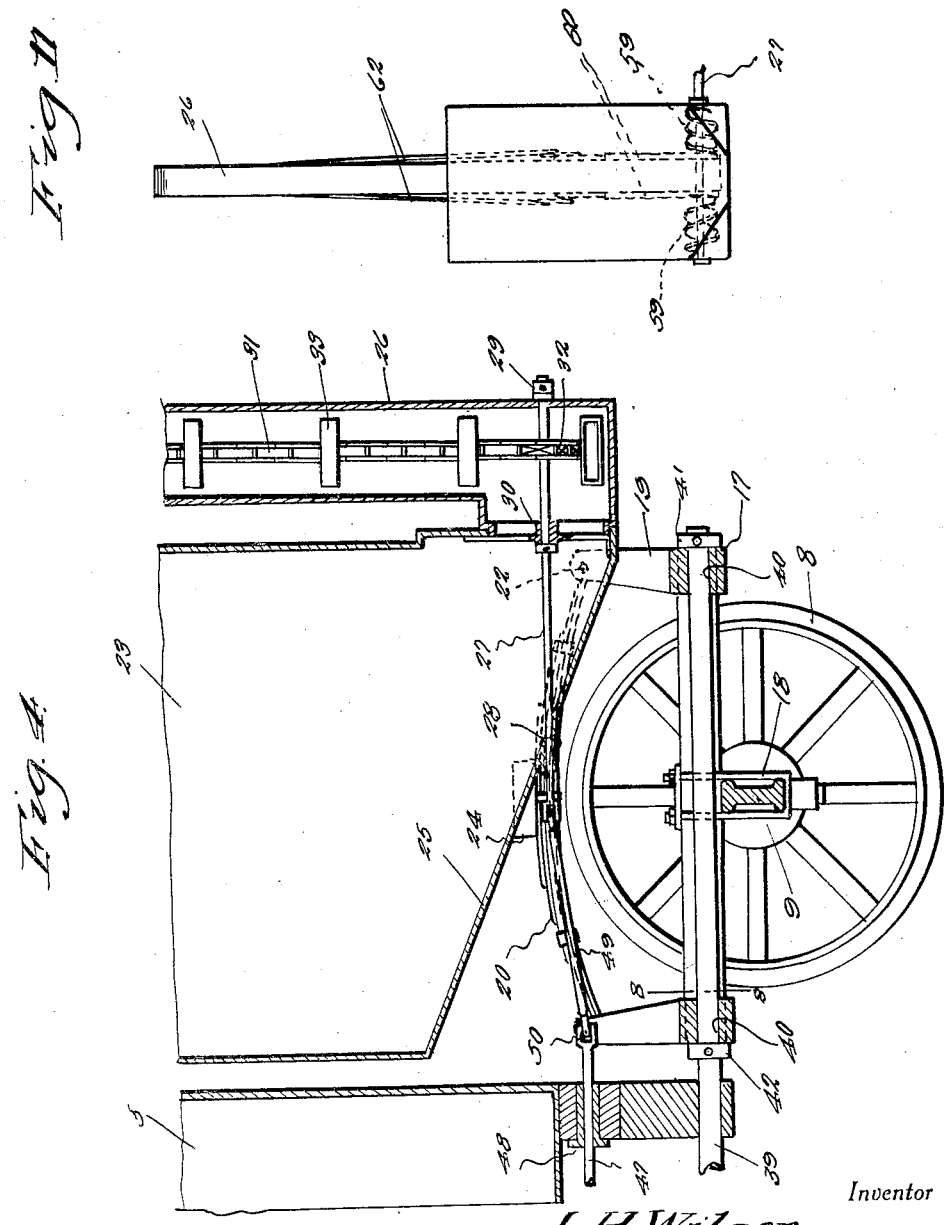
Inventor
J. H. Wilson
By Clarence A. O'Brien
Attorney

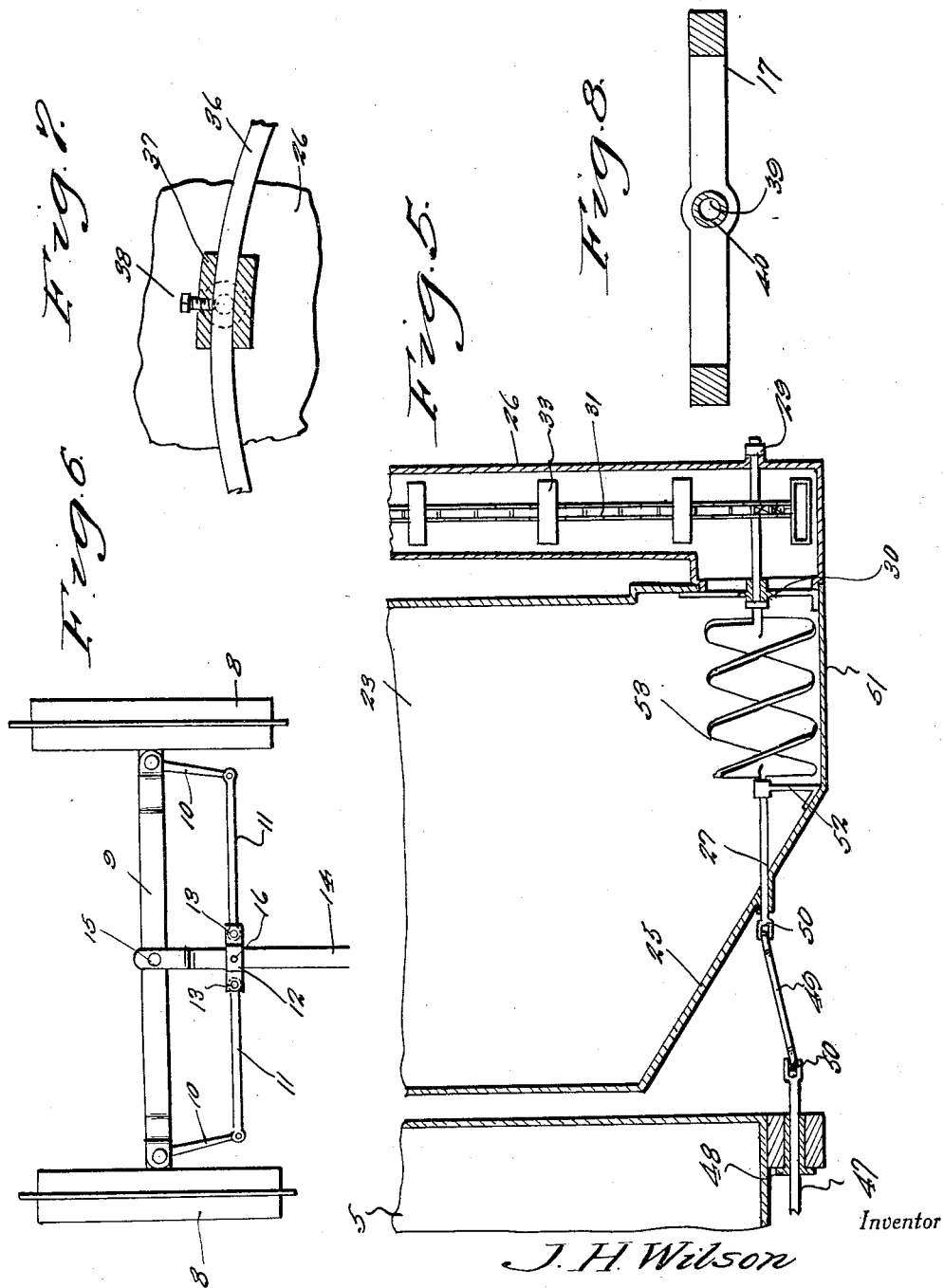

March 24, 1931. J. H. WILSON 1,797,462
TANK FOR COMBINED HARVESTERS AND THRASHERS
Filed Jan. 14, 1930  5 Sheets-Sheet 5
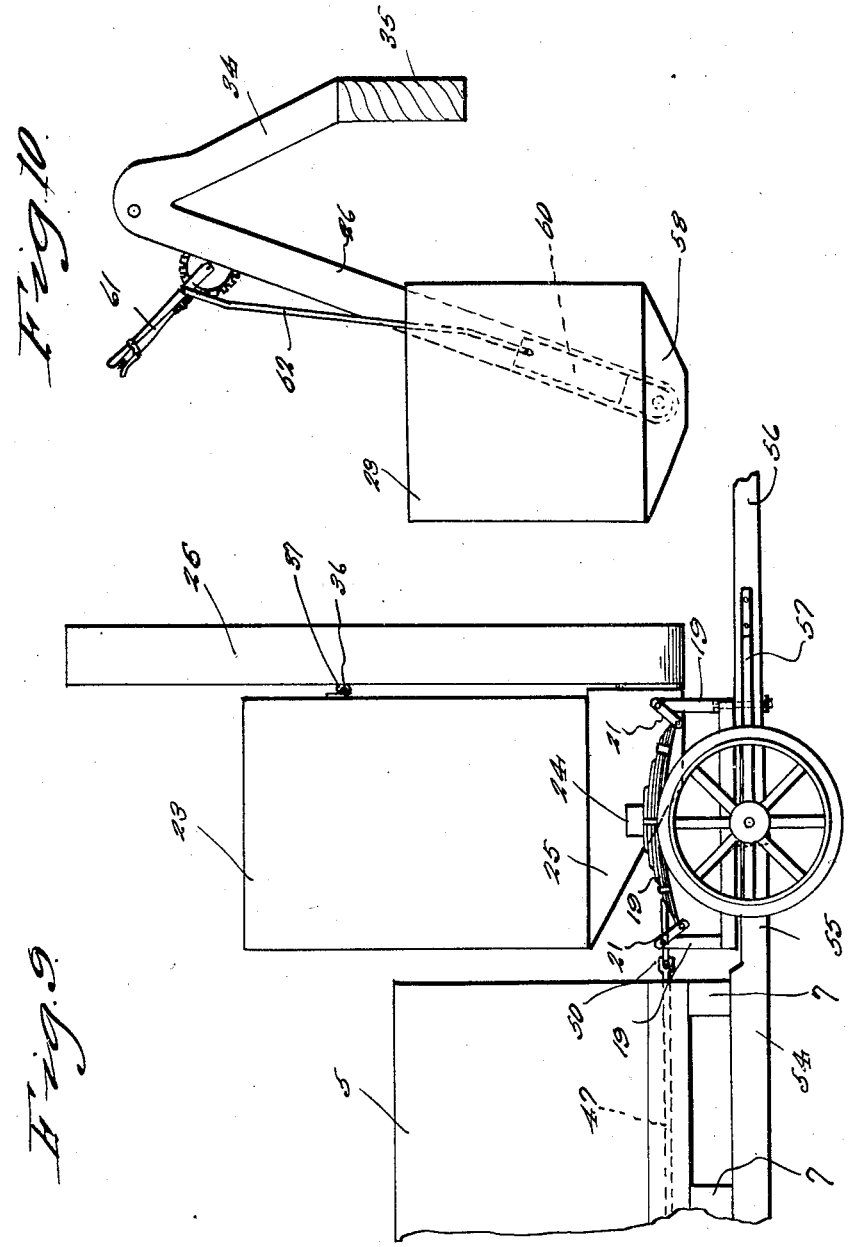
Inventor
J. H. Wilson
By Clarence A. O'Brien
Attorney Patented Mar. 24, 1931

1,797,462

UNITED STATES PATENT OFFICE

JOHN HARRY WILSON, OF COFFEE CREEK, MONTANA

TANK FOR COMBINED HARVESTERS AND THRASHERS

Application filed January 14, 1930. Serial No. 420,718.

This invention relates to agricultural machines and more particularly to combined harvesters and thrashers and has for one of its objects to provide, in a manner as hereinafter set forth, a grain receiving tank for the reception and temporary storage of said grain after it leaves the thrashing mechanism.

Another important object of the invention is to provide a grain receiving tank for combined harvesters and thrashers of the character described, which embodies means for expeditiously elevating and discharging the contents thereof into another receptacle or container, such as a truck body or freight car.

A further important object of the invention is to provide, in a manner as hereinafter set forth, a tank of the aforementioned character which is provided with wheeled supporting means adapted to be operatively connected to the combine whereby said combine will be relieved of the excessive weight of the tank at all times and particularly when the same is full.

A still further object of the invention is to provide a tank of the aforementioned character which may be expeditiously coupled to the combine or uncoupled therefrom when it is so desired and wherein the elevating and discharge mechanism of said tank may be operatively connected to suitable mechanism on the combine for the purpose of driving the same.

Still further objects of the invention are to provide a tank of the character set forth which will be simple in construction, strong, durable, efficient in its use and which may be manufactured at low cost.

The foregoing and still further objects and advantages of the invention will become apparent from a study of the following specification, taken in connection with the accompanying drawings wherein like characters of reference designate corresponding parts throughout the several views, and wherein:—

Figure 1 is a top plan view of a combined harvester and thrasher joined to the tank constructed in accordance with this invention associated therewith.

Figure 2 is a view in side elevation of the invention in position in front of the combine, the forward portion only of said combine being shown.

Figure 3 is a view in front elevation of the invention.

Figure 4 is a fragmentary vertical longitudinal sectional view thereof.

Figure 5 is a fragmentary vertical longitudinal sectional view showing a slightly modified form of the invention.

Figure 6 is a view in top plan showing the wheeled supporting truck and steering mechanism therefor.

Figure 7 is a fragmentary detail view in section showing the discharge spout guide and securing means.

Figure 8 is a vertical cross sectional view through the truck frame taken substantially on the line 8—8 of Figure 4.

Figure 9 is a view in side elevation showing a slightly modified form of the supporting truck.

Figure 10 is a view in front elevation of a tank wherein the elevating and discharge means therefor is disposed within the same.

Figure 11 is a view in side elevation of the modified form of the invention illustrated in Figure 10.

Referring to the drawings in detail, the reference character 1 designates generally a combined harvester and thrasher of conventional construction which is provided with the usual thrashing mechanism and the reel 2, cutter 3 and the endless conveyor or apron 4 for delivering the grain thereto. The harvester is also provided, at its front end, with what is generally known as a feeder house 5, which is mounted on the longitudinally extending sills 6 which, in turn, are supported on the transverse beams 7.

The device constituting this invention comprises a pair of wheels 8 which are mounted for rotation on the opposite end of the axle 9 through the medium of the rotatably mounted knuckles or stub axles 10 which are operatively connected together in a manner to turn the wheels in unison through the medium of the tie rod 11, see Figure 6. It should be here mentioned that a tie rod 11 is secured to each of the knuckles 10 at their outer ends and have their inner ends connected together through the medium of the annulus 12 upon the opposite side of which are mounted the pairs of outwardly extending ears 13 between which the adjacent end of each tie rod is disposed and pivotally connected thereto. A tongue 14 is pivotally connected, as at 15, to the intermediate portion of the axle 9 and said tongue extends forwardly therefrom through the annulus 12 and may have its forward end connected to the tractor which draws the combine. A transverse pin 16 extends through the annulus 12 and the tongue 14 for preventing longitudinal movement of said annulus on said tongue.

A rectangular frame 17 is mounted on the axle 9 through the medium of the U-bolts 18 which embrace said axle and extend vertically through the side members of said frame. Vertical standard 19 are mounted at the corners of the frame 17 and longitudinally extending semi-elliptical leaf springs 20 are pivotally between the front and rear standard on each side of the frame through the medium of the shackles 21. As illustrated in Figure 4 of the drawings, the standards 19 may be bifurcated and the opposite ends of the springs connected directly thereto between the arms thereof as indicated at 22.

The tank 23 is mounted rigidly on the intermediate portion of the leaf spring 20 through the medium of the bracket 24 and said tank may be of any suitable material, such as metal. The bottom 25 of the tank slopes inwardly toward the longitudinal center thereof from the opposite side and said bottom also slopes from the rear wall of said tank to the front wall thereof. The lowermost point of the front wall of the tank 23 is provided with an opening in which is rotatably mounted the right angularly disposed lower end portion of the casing 26 of an elevator. As will be apparent, the elevator casing 26 communicates with the tank through the opening in the front wall thereof. A longitudinally extending horizontally disposed shaft 27 extends for rotation into the tank 23 through an integral bearing sleeve 28 on the bottom thereof (see Figure 4) and said shaft extends through the discharge opening in said tank and is supported for rotation in the forward wall of the elevator casing 26 as indicated at 29. An intermediate supporting bearing 30 is mounted in the tank 23 and disposed across the discharge opening therein for lending rigidity to the shaft. The elevator, in addition to the casing 26 includes an endless chain 31 which is trained over a sprocket wheel 32 which is fixed on the shaft 27, and as usual, said chain is also trained over a sprocket wheel mounted for rotation in the uppermost portion of the casing, not shown. Buckets 33 are mounted in spaced relation on the endless chain 31 and are adapted to travel therewith through the casing 26. The casing 26 is provided, at its upper end, with an outwardly and downwardly extending discharge spout 34 from the lower of which is suspended a flexible nozzle 35. The elevator is adapted to be swung to any desired position laterally with respect to the tank 23 and for the purpose of supporting the same in adjusted position, an arcuate guide rod 36 is secured to the front wall of the tank 23 in forwardly spaced relation thereto, and as best illustrated in Figure 7 of the drawings, a block 37 is slidably mounted on said guide rod and secured to the rear wall of the elevator casing. A set screw 38 is threaded into the block 37 for engagement with the rod 36 to secure said block and the elevator in adjusted position.

For the purpose of coupling the device to the combine, an elongated longitudinally extending shaft 39 is mounted transversely in the beams 7 of said combine and project forwardly therefrom. The forwardly extending portion of the shaft 39 extends through the opening 40 provided centrally in the front and rear bars of the frame 17 and stop collars 41 and 42 are fixed on said shaft 39 adjacent the front and rear sides of said frame bars, respectively, for preventing longitudinal movement of said frame on said shaft when the device is in operation. As will be apparent, this method of connecting the truck to the combine will permit lateral rocking to a desired extent of said truck.

As illustrated to advantage in Figure 2 of the drawings, bracing means may be provided for the upper end of the shank in the form of a substantially inverted V-shaped bracket 43 the upper end of which is provided with an eye 44 through which extends a longitudinal bar 45 which is connected to a bracket 46 which projects upwardly from the rear wall of said tank 23.

A drive shaft 47 is journaled through the supporting frame of the combine, as indicated at 48 and said drive shaft is operatively connected to any convenient mechanism on the combine in a manner to derive power therefrom. The forward end of the drive shaft 47 is operatively connected to the shaft 27 through the medium of the elongated coupling rod 49 and the universal joint 50 on the opposite end thereof and on the adjacent end of the shafts 27 and 47.

In the form of the invention illustrated in Figure 5 of the drawings, the bottom of the tank 23 is provided with a horizontally disposed portion 51 adjacent the inner end of which is mounted an upstanding bracket 52 through which is journaled the shaft 27 and fixed on said shaft 27 between the bracket 52 and the bearing support 30 is a worm or screw conveyor 53, the purpose of which is to accelerate the discharge of the grain from the tank and to prevent clogging of said grain in the discharge opening of said tank.

In the form of the invention illustrated in Figure 9 of the drawings, a forwardly extending longitudinal beam 54 is mounted beneath the cross beam 7 of the combine and is provided with a reduced forwardly extending portion 55 which is hingedly connected to an intermediate portion of the axle 9 of the truck. In this form of the invention, the stub axles or steering knuckles 10 and the tie rod 11 are dispensed with and the wheels 8 are mounted for rotation on the opposite ends of the axle 9 and are not adapted to turn thereon for the purpose of steering. A tongue 56 is rigidly secured to the intermediate portion of the axle 9 in this form of the invention and extends forwardly therefrom and is provided with the diagonal braces 57 for lending rigidly thereto.

In the modification illustrated in Figures 10 and 11 of the drawings, the elevator casing 26 is disposed within the tank 23, the lower end of said elevator being disposed centrally adjacent the bottom of said tank. As clearly seen in Figure 10, the bottom of the tank in this form of the invention is in the form of a hopper and is designated by the reference numeral 58. The shaft 27 extends longitudinally through said hopper shaped bottom and has fixed thereon, on the front and rear side of the elevator, the oppositely spiralled worm conveyors 59, the outer ends of which may be disposed in substantially semi-circular channels formed in the inclined wall of the bottom. The opening in the front and rear side of the casing through which the worm conveyors 59 deliver the grain are controlled through the medium of the slide plate 60 which are actuated by a hand lever 61 mounted adjacent the upper end of the elevator and connected to said slide plate through the medium of the rod 62. As best illustrated in Figure 1 of the drawings, the grain is delivered from the thrashing mechanism of the combine into the open upper end of the tank 23 through the medium of the pneumatic conveyor 63.

In the use of the invention, the tank is coupled to the combine and travels therewith over the field to be harvested and when the tank 23 has been filled, the elevator is disposed over the body of a truck and said elevator is then driven from any suitable source of power. A clutch (not shown) is to be provided in the shaft 47 and when said shaft is operatively connected for actuation to the combine mechanism, said clutch will be normally disengaged. When such is the case, the truck into which the tank 23 is to be emptied is driven along beside said tank as the same moves over the ground with the combine and when it is desired to empty the contents of the tank into the truck, the truck will be engaged for the purpose of actuating the elevator.

It is believed that the many advantages of a tank for combined harvesters and thrashers constructed in accordance with this invention will be readily understood, and although the preferred embodiment of the invention is as illustrated and described, it is to be understood that changes in the details of construction may be had which will fall within the scope of the invention as claimed.

What is claimed:—

1. In a tank for combined harvesters and thrashers, said tank adapted for disposition forwardly of said combined harvester and thrasher, a rectangular wheeled supporting frame for the tank, a longitudinal shaft rotatably extending centrally through the frame in a manner to permit said frame to rock thereon, said shaft rigidly secured to the combined harvester and thrasher, stop collars fixed on the shaft for engagement with the front and rear side of the frame for preventing longitudinal movement of said frame on the shaft.

2. In a tank for combined harvesters and thrashers, said tank adapted for disposition forwardly of said combined harvester and thrasher, a rectangular wheeled supporting frame for the tank, a longitudinal shaft rotatably extending centrally through the frame in a manner to permit said frame to rock thereon, said shaft rigidly secured to the combined harvester and thrasher, stop collars fixed on the shaft for engagement with the front and rear side of the frame for preventing longitudinal movement of said frame on the shaft, pairs of vertical standards mounted on the frame, longitudinally extending leaf springs supported, at their opposite ends, on the upper end portion of the standards, said tank mounted on the intermediate portion of the springs.

3. In a tank for combined harvesters and thrashers, said tank adapted for disposition forwardly of said combined harvester and thrasher, a rectangular wheeled supporting frame for the tank, a longitudinal shaft rotatably extending centrally through the frame in a manner to permit said frame to rock thereon, said shaft rigidly secured to the combine, stop collars fixed on the shaft for engagement with the front and rear sides of the frame for preventing longitudinal movement of said frame on the shaft, vertical standards mounted on the corner portions of the rectangular frame, leaf springs supported, at their opposite ends, between the front and rear standards on the opposite sides of the frame, said tank mounted on the intermediate portions of the springs, and a discharge elevator operatively connected to the lower end of the tank forwardly thereof and extending upwardly therefrom and connected thereto in a manner to swing in a vertical plane thereon.

4. In a tank for combined harvesters and thrashers, said tank adapted for disposition forwardly of said combined harvester and thrasher, a rectangular wheeled supporting frame for the tank, a longitudinal shaft rotatably extending centrally through the frame in a manner to permit said frame to rock thereon, said shaft rigidly secured to the combine, stop collars fixed on the shaft for engagement with the front and rear sides of the frame for preventing longitudinal movement of said frame on the shaft, vertical standards mounted on the corner portions of the rectangular frame, leaf springs supported, at their opposite ends, between the front and rear standards on the opposite sides of the frame, said tank mounted on the intermediate portions of the springs, and a discharge elevator operatively connected to the lower end of the tank forwardly thereof and extending upwardly therefrom and connected thereto in a manner to swing in a vertical plane thereto, a drive shaft mounted in the lower end of the tank and extending into the elevator and constituting means for actuating the same, said drive shaft being operatively connected to a suitable source of power.

5. In a tank for combined harvesters and thrashers, said tank adapted for disposition forwardly of said combined harvester and thrasher, a horizontally disposed rectangular wheeled supporting frame for the tank, a longitudinal shaft rotatably extending centrally through the frame in a manner to permit said frame to rock thereon, said shaft rigidly secured to the combined harvester and thrasher, stop collars fixed on the shaft for engagement with the front and rear sides of the frame for preventing longitudinal movement of said frame on the shaft, vertical standards mounted on the rectangular frame, springs supported, at their opposite ends, on the upper end of the standards, said tanks fixed to the intermediate portion of the springs, an elevator mechanism disposed within the tank and extending upwardly therefrom, a shaft extending through the bottom portion of the tank and the lower end of the elevator and adapted for rotation therein, worm conveyors fixed on the shaft on opposite sides of the elevator for conveying the contents of the tank thereinto and means for operatively connecting the shaft to a suitable source of power.

6. In a tank for combined harvesters and thrashers, said tank adapted for disposition forwardly of said combined harvester and thrasher, a rectangular horizontally disposed wheeled supporting frame for the tank, a longitudinal shaft rotatably extending centrally through the frame in a manner to permit said frame to rock thereon, said shaft rigidly secured to the combined harvester and thrasher, stop collars fixed on the shaft for engagement with the front and rear sides of the rectangular frame for preventing longitudinal movement of said frame on the shaft, vertical standards on the corner portions of the frame, leaf springs supported, at their opposite ends, on the standards, said tank being mounted on the intermediate portions of the springs, an elevator mechanism rotatably mounted for swinging movement in a vertical plane on the lower end portion of the tank and forwardly thereof, a shaft extending rotatably through the lower end portion of the tank and the elevator and constituting means for actuating said elevator, said tank being provided with a discharge opening communicating with the elevator through which the shaft extends centrally, and a worm conveyor fixed on the shaft within the tank and adjacent the opening for discharging the contents of said tank through the opening and into the elevator.

In testimony whereof I affix my signature.

J. HARRY WILSON.